United States Patent
Schat

(10) Patent No.: US 10,573,107 B2
(45) Date of Patent: Feb. 25, 2020

(54) METHOD FOR PROTECTING A PASSIVE KEYLESS ENTRY SYSTEM AGAINST A RELAY ATTACK

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/042,252

(22) Filed: Jul. 23, 2018

(65) Prior Publication Data
US 2020/0027294 A1    Jan. 23, 2020

(51) Int. Cl.
| | | |
|---|---|---|
| G07C 9/00 | (2006.01) | |
| G01S 13/93 | (2006.01) | |
| B60R 25/24 | (2013.01) | |
| G01S 13/931 | (2020.01) | |

(52) U.S. Cl.
CPC ........ G07C 9/00309 (2013.01); B60R 25/245 (2013.01); B60R 25/246 (2013.01); G01S 13/931 (2013.01); G07C 9/00658 (2013.01); G07C 2009/00396 (2013.01); G07C 2009/00555 (2013.01)

(58) Field of Classification Search
CPC ...... G07C 9/00309; G07C 2009/00769; G07C 9/00111; G07C 9/00571; G07C 9/00007; G07C 2209/63; G07C 2009/00793; G07C 9/00103; G07C 9/00896
USPC ....................................................... 340/5.61
See application file for complete search history.

(56) References Cited

U.S. PATENT DOCUMENTS

| | | | |
|---|---|---|---|
| 6,252,962 B1 | 6/2001 | Sagey | |
| 6,489,893 B1 | 12/2002 | Richards et al. | |
| 6,759,948 B2 | 7/2004 | Grisham et al. | |
| 6,774,764 B2 | 8/2004 | Ghosh et al. | |
| 6,963,727 B2 | 11/2005 | Shreve | |
| 7,075,476 B2 | 7/2006 | Kim | |
| 7,148,791 B2 | 12/2006 | Grisham et al. | |
| 7,629,919 B2 * | 12/2009 | Wilcox | G01S 13/825 342/118 |
| 8,892,031 B2 | 11/2014 | Hamida et al. | |

(Continued)

FOREIGN PATENT DOCUMENTS

GB    2558589 A    7/2018

OTHER PUBLICATIONS

IEEE Standard for Low-Rate Wireless Personal Area Networks (WPANs), IEEE Std 802.15.4-2015.

(Continued)

*Primary Examiner* — Mark S Blouin
(74) *Attorney, Agent, or Firm* — Daniel D. Hill

(57) ABSTRACT

A method is provided for authenticating a transceiver in a keyless entry system for a vehicle. The method uses a collision avoidance radar system on the vehicle for authenticating a key fob radar transceiver. A lower power radar signal is transmitted from the vehicle. The lower power radar signal is transmitted below an ambient noise level to make the radar signal difficult for an attacker to detect. The key fob transceiver is then authenticated as being a legitimate transceiver for accessing the vehicle using the low power radar signal. A distance bounding scheme may be used to determine if the key fob is within a predetermined distance. Challenge/response communications may be used to authenticate that the key fob is the legitimate key fob.

20 Claims, 3 Drawing Sheets

(56) References Cited

U.S. PATENT DOCUMENTS

| | | | |
|---|---|---|---|
| 8,930,045 B2 | 1/2015 | Oman et al. | |
| 9,485,609 B2* | 11/2016 | Hekstra | H04W 4/80 |
| 2008/0024322 A1* | 1/2008 | Riemschneider | G06K 7/0008 |
| | | | 340/904 |
| 2014/0094129 A1 | 4/2014 | Chang et al. | |
| 2014/0330449 A1* | 11/2014 | Oman | G01S 13/765 |
| | | | 701/2 |
| 2016/0098874 A1* | 4/2016 | Handville | G07C 9/00007 |
| | | | 340/5.61 |
| 2017/0303084 A1* | 10/2017 | Bruckner | B60R 25/248 |

OTHER PUBLICATIONS

Flury, Manuel, et al.; "Effectiveness of Distance-Decreasing Attacks Against Impulse Radio Ranging;" 3rd ACM Conference on Wireless Network Security, 2010.

Hancke, G.P., et al.; "Confidence in Smart Token Proximity: Relay Attacks Revisited," Journal Computers and Security; vol. 28, Issue 7; Oct. 2009; pp. 615-627.

Lu, Li, et al.; "A FMCW-Based Cross Layer RF Distance Bounding Scheme" IEEE Transactions on Wireless Communications, vol. 15, No. 6, Jun. 2016, p. 4009-4016.

Poturalski, Marcin, et al.; "Distance Bounding with IEEE 802.15. 4a: Attacks and Countermeasures;" IEEE Transactions on Wireless Communications; Apr. 2011; vol. 10, Issue: 4.

Poturalski, Marcin, et al.; "The Cicada Attack: Degradation and Denial of Service in IR Ranging;" 2010 IEEE International Conference on Ultra-Wideband (ICUWB2010).

Sasakawa, Dai, et al.; "Evaluation of Fast Human Localization and Tracking using MIMO Radar in Multi-path Environment;" 2016 IEEE 27th Annual International Symposium on Personal, Indoor, and Mobile Radio Communications (PIMRC).

U.S. Appl. No. 15/611,014; Thomas Baier, et al.; "Processing Module for a Communication Device and Method Therefor;"; filed Jun. 1, 2017.

Ranganathan, Aanjhan, et al.; "FMCW-based Realization of Distance Bounding Protocols;" 2012; https://doi.org/10.3929/ethz-a-007315735.

* cited by examiner

METHOD FOR PROTECTING A PASSIVE KEYLESS ENTRY SYSTEM AGAINST A RELAY ATTACK

BACKGROUND

Field

This disclosure relates generally to automobile security, and more particularly, to a method for protecting a passive keyless entry system against a relay attack.

Related Art

The theft of automobiles is a serious problem even with numerous security mechanisms. Relay attacks are used to gain access to cars where the car owner and legitimate key fob are more distant from the car than the attackers. In the relay attack, the security system of the car is deceived about the actual distance between the legitimate key fob and the car by a relay channel set up between the legitimate key fob, two attackers, and the car. Distance bounding countermeasures to the relay attack include the use of ultra-wideband (UWB) based systems to ensure that the key fob is near the car. Suggestions for protecting against the relay attack include shielding the key and removing the battery. However, these suggestions might not be practical for someone who uses the key fob to access the car. Also, distance bounding as a countermeasure is not as secure as once believed.

Therefore, a need exists for a method to protect against a relay attack that provides better security while still being relatively inexpensive to implement.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
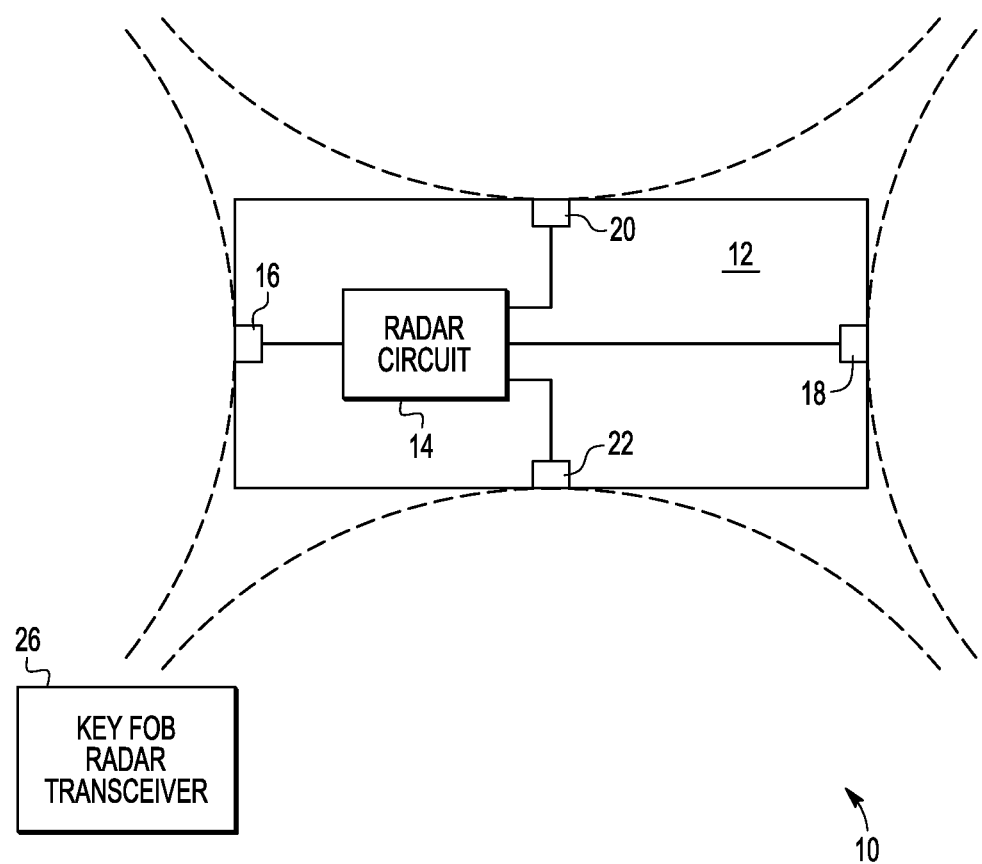
FIG. 1 illustrates a simplified view of an automobile radar system in accordance with an embodiment.

Generally, there is provided, a method for authenticating a transceiver for accessing a keyless entry system of a vehicle. Many vehicles today include radar transmitters and radar receivers on the front, back, and sides of vehicles for detecting the presence of obstacles that may be a hazard or otherwise influence the safety of the vehicle. The method uses the radar transmitters and receivers that are on the vehicle for obstacle detection for authenticating the key fob for vehicle access. In one embodiment, a lower power radar signal is transmitted. The lower power radar signal may be below an ambient noise level to make detection by an attacker difficult. The lower power radar signal may be used for exchanging spread spectrum challenge/response messages with a key fob radar transceiver. Alternately, one or more of the radar transmitters may be used for distance bounding to determine if the key fob transceiver is within a predetermined distance from the vehicle. In another embodiment, the lower power radar signal may be first used to determine that a distance between the vehicle and the key fob transceiver is less than the predetermined distance, and if the distance is less than the predetermined distance, further authenticating that the transceiver is a legitimate transceiver by using the low power radar signal to communicate with the transceiver of the key fob using spread spectrum challenge/response messages.

Using the vehicle radar transmitters and receivers as disclosed increases protection from attacks, such as relay attacks. Also, because the vehicle's obstacle detection radar system is used to provide both obstacle detection and the low power radar signal for authentication, increased vehicle security can be provided with relatively low cost. In addition, the use of distance bounding and challenge/response authentication together provides better security.

In accordance with an embodiment, there is provided, a method for authenticating a transceiver in a keyless entry system for a vehicle, the method includes: transmitting a low power radar signal from the vehicle, wherein the low power radar signal is transmitted below an ambient noise level; and authenticating that the transceiver is a legitimate transceiver for accessing the vehicle using the low power radar signal. The vehicle may detect that a transceiver is within a predetermined range using a 125 kHz signal prior to transmitting the low power radar signal. Transmitting a low power radar signal and authenticating that the transceiver is a legitimate transceiver may further include communicating spread spectrum challenge/response messages using the low power radar signal below the ambient noise level. Transmitting a low power radar signal from the vehicle may further include: transmitting a first low power radar signal from a first transmitter fixed at a first location on the vehicle; and transmitting a second low power radar signal from a second transmitter fixed at a second location on the vehicle, the first location being different than the second location. The first location may be on a first side of the vehicle and the second location may be on the second side of the vehicle. Authenticating that the transceiver is a legitimate transceiver may further include determining that the transceiver is within a predetermined distance from the vehicle based on the low power radar signal. Authenticating that the transceiver is a legitimate transceiver for accessing the vehicle may further include, after determining that the transceiver is within a predetermined distance, authenticating using challenge/response messages communicated using the low power radar signal as a spread spectrum signal transmitted at a power level below the ambient noise level. Transmitting a low power radar signal for the vehicle may further include attenuating a collision avoidance radar signal to a level below the ambient noise level by changing an operating mode of a power amplifier used for amplifying the collision avoidance radar signal. The low power radar signal may be characterized as being a radar signal in the 76 to 77 GHz band of the 77 to 81 GHz band.

In another embodiment, there is provided, a method for authenticating a transceiver in a keyless entry system for a vehicle, the method including: attenuating a collision avoidance radar signal generated on the vehicle to produce a low power radar signal having a power level below an ambient noise level; transmitting the low power radar signal from the vehicle in response to a signal received from the transceiver; and using the low power radar signal, authenticating that the transceiver is a legitimate transceiver for accessing the vehicle. Transmitting a low power radar signal and authenticating that the transceiver is a legitimate transceiver may further include communicating spread spectrum challenge/response messages using the low power radar signal below the ambient noise level. Transmitting a low power radar signal from the vehicle may further include: transmitting a first low power radar signal from a first transmitter fixed at a first location on the vehicle; and transmitting a second low power radar signal from a second transmitter fixed at a second location on the vehicle, the first location being different than the second location. Authenticating that the transceiver is a legitimate transceiver may further include determining that the transceiver is within a predetermined distance from the vehicle based on the low power radar signal. Authenticating that the transceiver is a legitimate transceiver for accessing the vehicle may further include authenticating using challenge/response messages communicated using a usable bandwidth of the low power radar signal as a spread spectrum signal transmitted at a power level below the ambient noise level. Authenticating that the transceiver is a legitimate transceiver may further include: determining that the transceiver is within a predetermined distance from the vehicle based on the low power radar signal; and authenticating that the transceiver is a legitimate transceiver using challenge/response messages communicated using the low power radar signal as a spread spectrum signal transmitted at a power level below the ambient noise level.

In yet another embodiment, there is provided, a method for authenticating a transceiver in a keyless entry system for a vehicle, the method including: attenuating a 77 GHz collision avoidance radar signal generated on the vehicle to produce a low power radar signal having a power level below an ambient noise level; transmitting the low power radar signal from the vehicle in response to a signal received from the transceiver; using the low power radar signal, authenticating that the transceiver is a legitimate transceiver for accessing the vehicle using the low power radar signal to determine that a distance between the vehicle and the transceiver is less than predetermined distance; and authenticating that the transceiver is a legitimate transceiver using the low power radar signal to communicate with the transceiver using spread spectrum challenge/response messages. Transmitting a low power radar signal from the vehicle may further include: transmitting a first low power radar signal from a first transmitter fixed at a first location on the vehicle; and transmitting a second low power radar signal from a second transmitter fixed at a second location on the vehicle, the first location being different than the second location. The first location may be on a first side of the vehicle and the second location may be on the second side of the vehicle. Authenticating that the transceiver is a legitimate transceiver for accessing the vehicle may further include providing the transceiver with a radar transceiver for communicating the challenge response message. The transceiver may be determined to be less than the predetermined distance from the vehicle before using the spread spectrum challenge/response messages to authenticate that the transceiver is the legitimate transceiver.

FIG. 1 illustrates a simplified view of an automobile radar system 10 in accordance with an embodiment. Automobile radar system 10 is implemented on a vehicle 12, and includes a radar circuit 14 for providing and receiving radar information from radar transmitters and receivers 16, 18, 20, and 22. Vehicle 12 may be any kind of vehicle that can benefit from a security system and that is equipped with a collision avoidance radar. Vehicle 12 may also be referred to as a car, automobile, truck, bus, or other type of vehicle that can benefit from the described embodiments. Radar transmitter and receiver circuit 16 may be on a front portion of vehicle 12. Radar transmitter and receiver circuits 18 and 20 may each be on a side of vehicle 12. Radar transmitter and receiver circuit 22 may be on a rear of vehicle 12. Automobile radar system 10 also includes a key fob 26. Key fob 26 is a conventional key fob except that key fob 26 also includes a radar transceiver for communicating with the automobile radar system for vehicle access. Radar transmitters and receivers 16, 18, 20, and 22 may be arranged around the vehicle to provide complete 360-degree obstacle detection. For example, radar transmitters 16 and 18 are at the front and rear locations of the vehicle, such as the bumpers, while radar transmitters 20 and 22 are located on the sides of the vehicle, such on the rear-view mirrors. In another embodiment, there may be a different number of radar transmitters and receivers and they may be fixed in different locations. The dashed lines radiating from radar transmitters 16, 18, 20, and 22 in FIG. 1 illustrate a simplified and approximated radar emission coverage from each of the radar transmitters on the vehicle. Preferably, the radar coverage provided by radar transmitters and receivers 16, 18, 20, and 22 overlaps to provide 360 degrees of radar coverage around the vehicle. The dual uses of the radar system for obstacle detection and authentication of a key fob are naturally deconflicted because both uses are not required at the same time. Obstacle detection is only necessary when the vehicle is moving, whereas authentication of a key fob is only needed when the vehicle is stationary.

In one embodiment, the automobile radar signal is used for the transmission of challenge/response messages for authentication using a spread spectrum technique. To make the radar signal more difficult for an attacker to detect, capture, and to superimpose with the attacker's hacked version, the radar signal may be transmitted with a signal level below an ambient noise floor.

Authentication via challenge/response messages ensures a key fob is allowed to open the vehicle. The challenge/response communication may be any type of conventional challenge/response, such as a communication that uses a secret key and a cryptographic algorithm. For example, in one embodiment, the authentication process involves a common secret between the key fob and the vehicle. The vehicle will first transmit a challenge word to the key fob. The key fob calculates response word based on the challenge word and on the common secret. The response word is transmitted to the vehicle. The vehicle knows from processing the response word if the key fob is in possession of the correct common secret. If the response word from the key fob is correct, the vehicle provides access. If the response word is incorrect, the vehicle does not provide access. To make the challenge/response authentication more resistant to attacks, a spread-spectrum approach is used. The usable bandwidth of a radar channel is higher than the bandwidth needed to transfer challenge/response messages with, e.g., a word length of 2048 bits. A radar channel at 77 GHz allows approximately a 1 GHz bandwidth, while for the challenge/response exchange a bandwidth of approximately 10 kHz would be sufficient. This allows a very large spreading of the transmitted messages. Given a channel capacity C calculated according to the Shannon-Harley theorem, $C=B*\log_2(1+S/N)$. If a bandwidth B is 1 GHz and a signal-to-noise power ratio S/N is $10^{-4}$ (that is, the signal is 40 dB below the noise floor), a theoretical channel capacity of C=1.4 Mbits/second can be achieved. The practically achievable channel capacity may be significantly below this value, however, still a value of 10 percent of the theoretical channel capacity is sufficient. The capability of having the radar signal power below the noise floor allows the challenge/response transmissions to be nearly undetectable by an attacker. Even if detected, having the radar signal below the noise floor makes it difficult for an attacker to synchronize the data stream, or to record the data stream in order to perform a replay attack. Also, jamming the radar signal would require a high-power jamming signal because the spread-spectrum transmission would be over a relatively large frequency band.

In another embodiment, the radar signal may be used for distance bounding, also with a low power radar signal below an ambient noise level. Distance bounding, as opposed to distance measurement simply makes sure that the distance is below a certain limit, usually a few meters. Distance bounding is sufficient and does not require the measurement of an exact distance, which is more difficult to achieve and easier to compromise. A conventional distance bounding method may be used. For example, distance bounding using a car radar may be based on a ultra-wideband (UWB) IEEE standard 802.15.4(a). Other conventional distance bounding methods may also be used. One or more radar transmitters 16, 18, 20, and 22 may be used for the distance bounding. A car radar in the 77 GHz band allows for a bandwidth of between 1 and 4 GHz, depending on the country. For better security, a hardware based rake receiver may be used instead of a cheaper less secure energy detector. To reduce cost, a software based rake receiver may be used. A software based rake receiver can be used because in commercial car radar integrated circuits, a down-converted signal is digitized at a data rate of, for example, 40 Mega samples/second and then provided to a post-processing unit, such as radar processor 32 illustrated in FIG. 2. In addition to processing the radar signals, radar processor 32 can also implement the rake receiver functionality. Also, several receivers with one antenna each may be implemented on a single integrated circuit. This enables relatively fast multipath detection which is needed for distance bounding.

One advantage of using 77 GHz radar signals is that the radar band is not bound to a certain modulation scheme. Hence, attack mechanisms based on an anomaly or weakness in, e.g., the IEEE 802.15.4(a) standard can be avoided by using one or more different modulation schemes.

In another embodiment, the above described low power radar based distance bounding and spread-spectrum challenge/response communication may be implemented together. In one example, the distance bounding detection of the key fob transceiver is determined. If the distance is less than a predetermined distance, then the key fob transceiver is near the car, and the transceiver is authenticated using the challenge/response messages. Both the distance bounding and the challenge/response portions are implemented with a low power radar signal below the ambient noise level. Alternately, the challenge/response portion of the key fob authentication may be performed before the distance bounding portion.

In another embodiment, a 125 kHz signal may be used to determine if a key fob transceiver is with a predetermined range prior to transmitting the low power radar signal.

Figure 2:
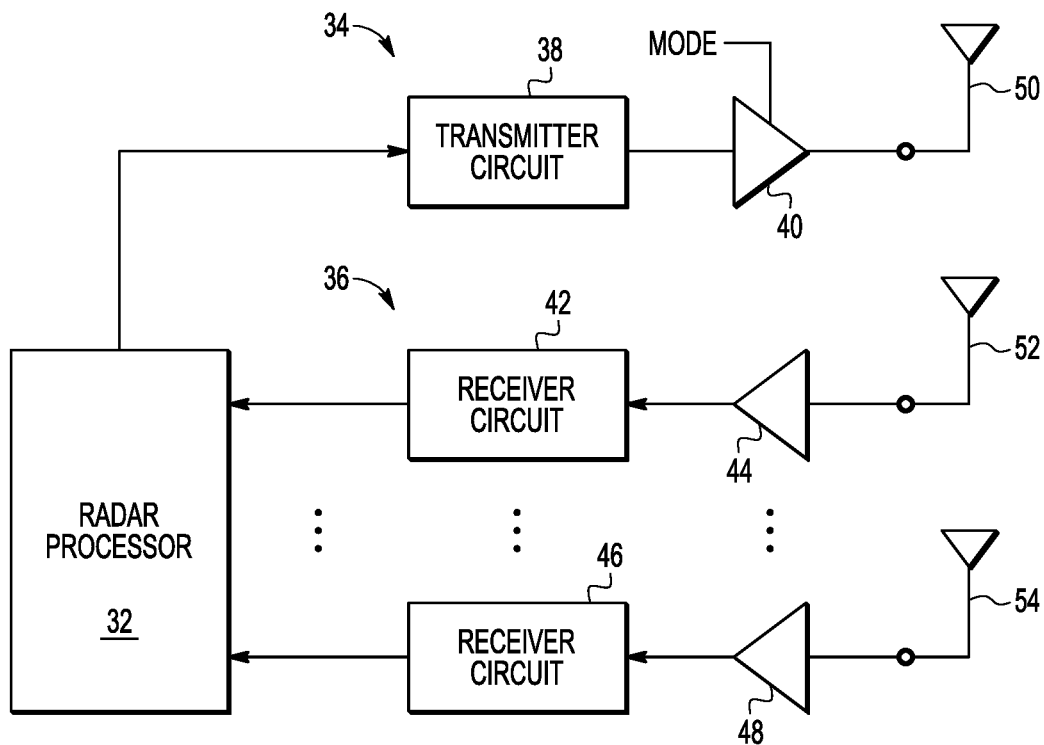
FIG. 2 illustrates a transmitter and receiver circuit for use in the automobile radar system in accordance with an embodiment.

FIG. 2 illustrates a simplified view of a radar transmitter and receiver circuit 30 for use in the radar system of FIG. 1 in accordance with an embodiment. A conventional radar integrated circuit may be used. Each of the radar transmitter and receiver circuits 16, 18, 20, and 22 may include radar transmitter and receiver circuit 30. Radar transmitter and receiver circuit 30 includes radar processor 32, a transmit path 34 and a plurality of receive paths 36. Transmit path 34 includes a transmitter circuit 38 and a power amplifier 40 coupled to an antenna 50. Other embodiments may have a plurality of transmit paths. Usually there are 2 or 3 transmitters and 3 or 4 receivers in a car radar IC. Power amplifier 40 is provided with a mode input labeled "MODE". The MODE input allows a generated 77 GHz collision avoidance radar signal, generated on the vehicle, to produce a low power radar signal having a power level below an ambient noise level when a low power mode is selected. There are several ways an attenuated radar signal can be produced. For example, the attenuation may be done by switching off power amplifier 40. The signal leaked through power amplifier 40 may be enough to provide the correct amplitude for transmission below a noise floor. Otherwise, the MODE input is selected to provide a higher power radar signal for obstacle detection. Providing the low power radar signal below the ambient noise level makes the authentication of a key fob transceiver more resistant to attacks. Also, using the radar signal provides a very high bandwidth. Also, a rake receiver can be implemented in software making it less costly. The transmission of the spread-spectrum sequence can be done by switching phase shifters (not shown) of power amplifier 40 at very high speed. In addition, using the MIMO based directivity and multi-path handling of the transmitted and received radar allows the radar antennas to be directed to the key fob transceiver.

The plurality of receiver circuits includes an antenna 52 coupled to an amplifier 44 and receiver circuit 42. Also, the plurality of receiver circuits includes an antenna 54 coupled to an amplifier 48 and receiver circuit 46. In other embodiments, there may be just one antenna that is switched between the different receive and transmit paths, or connected via a circular directional coupler. Receive circuits 42 and 46 are conventional receiver circuits and include circuits for converting the received radar signal to a form that can be used by radar processor 32. Radar processor 32 is configured to control the operation of radar transmitter and receiver circuit 30 and to process the signals received from the receive paths and to control the production of radar signals for transmission. Radar processor 32 may perform other functions as well, such as implementing a rake receiver.

Radar transmitter and receiver circuit 30 may be an implementation of a multiple-in, multiple-out (MIMO) car radar system that provides distance measurement for obstacle detection and distance bounding for key fob authentication in multipath environments. The multiple receive paths are provided with different delays and phase shifts relative to the transmitted signal from transmit path 38 to determine a relative velocity of a potential obstacle. Equipping each receive and transmit path with its own antenna allows high directivity from both the transmitting and receiving lobes in locating key fob transceiver 26. After the direction of key fob transceiver 26 has been found out by coarse sweeping of the transmitter lobe in all directions, the transmitter lobe can be directed to the direction of the key fob transceiver, thus saving transmit power and reducing the influence of multi-path propagation. However, for purposes of implementing the present invention according to a different embodiment, only one receive path and one transmit path may be used.

Figure 3:
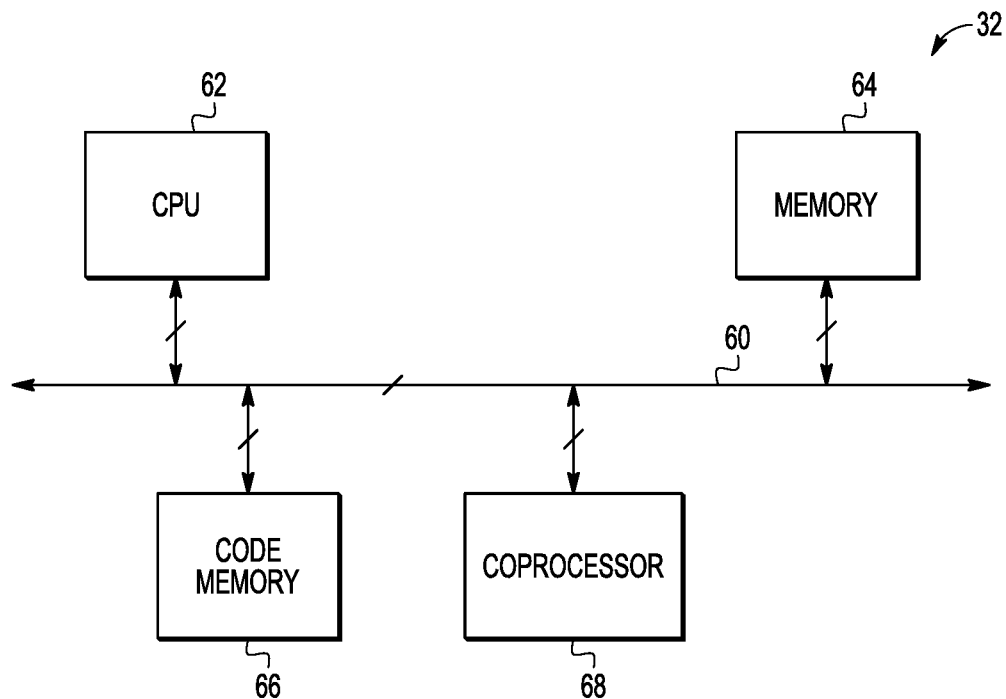
FIG. 3 illustrates the processor of the automobile radar circuit in accordance with an embodiment.

FIG. 3 illustrates a simplified view of radar processor 32 in accordance with an embodiment. Radar processor 32 includes data and address bus 60. Each of central processing unit (CPU) 62, memory 64, code memory 66, and coprocessor 68 are bi-directionally connected to bus 60. Radar processor 32 may be implemented on one or more integrated circuits. CPU 62 may be any hardware device capable of executing instructions stored in memory 64 or code memory 66. CPU 62 may be, for example, a microprocessor, field programmable gate array (FPGA), application-specific integrated circuit (ASIC), or similar device.

Data memory 64 may be any kind of memory, such as for example, L1, L2, or L3 cache or system memory. Memory 64 may include volatile memory such as static random-access memory (SRAM) or dynamic RAM (DRAM), or may include non-volatile memory such as flash memory, read only memory (ROM), or other volatile or non-volatile memory.

Code memory 66 may include one or more machine-readable storage media for storing instructions for execution by CPU 62. In other embodiments, memory 64 may also store data upon which CPU 62 may operate. Memory 64 may store, for example, a machine learning model, or encryption, decryption, or verification applications. A software implementation of a rake receiver may be implemented in memory 64. Memory 64 may be in the secure hardware element and be tamper-resistant.

Figure 4:
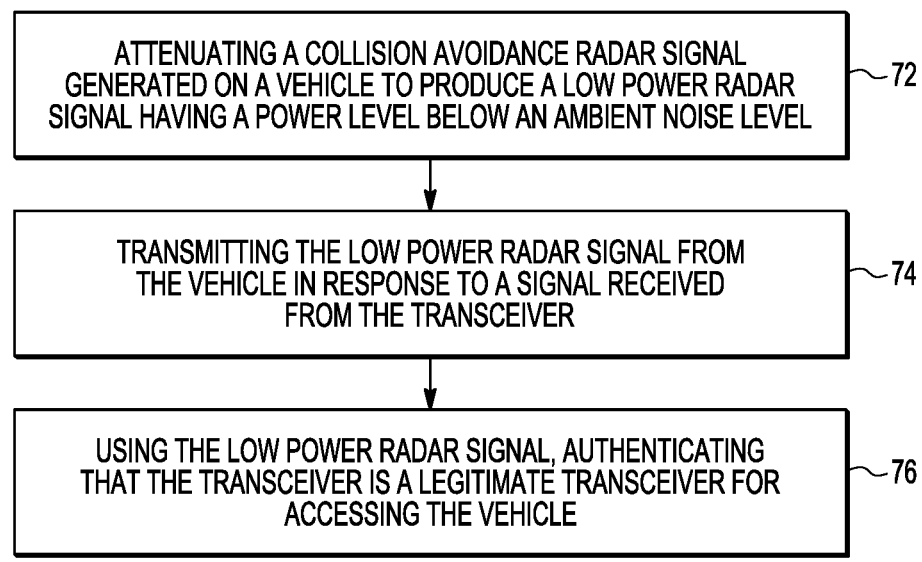
FIG. 4 illustrates a flow chart of a method for authenticating a key fob radar transceiver in accordance with an embodiment.

FIG. 4 illustrates a flow chart of a method 70 for authenticating a key fob radar transceiver in accordance with an embodiment. At step 72, a collision avoidance radar signal is generated on a vehicle. The radar signal is attenuated to produce a low power radar signal having a power level below an ambient noise level. At step 74, the low power radar signal is transmitted from the vehicle in response to a radar signal received from the key fob transceiver. At step 76, using the low power radar signal, the key fob transceiver is authenticated that it is the legitimate transceiver for accessing the vehicle. The authentication may include the distance bounding as described above. Alternately, the authentication may include the challenge/response communication as described above. In another embodiment, the authentication may include a combination of distance bounding and challenge/response communication.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for authenticating a transceiver in a keyless entry system for a vehicle, the method comprising:
   transmitting a low power radar signal from the vehicle, wherein the low power radar signal is transmitted below an ambient noise level; and
   authenticating that the transceiver is a legitimate transceiver for accessing the vehicle using the low power radar signal, wherein transmitting the low power radar signal comprises reducing a transmit power of a collision avoidance radar signal to a level below the ambient noise level by switching off a power amplifier used for amplifying the collision avoidance radar signal and transmitting the reduced power collision avoidance radar signal as the low power radar signal.

2. The method of claim 1, wherein the vehicle detects that a transceiver is within a predetermined range using a 125 kHz signal prior to transmitting the low power radar signal.

3. The method of claim 1, wherein transmitting a low power radar signal and authenticating that the transceiver is a legitimate transceiver further comprises communicating spread spectrum challenge/response messages using the low power radar signal below the ambient noise level.

4. The method of claim 1, wherein transmitting a low power radar signal from the vehicle further comprises:
   transmitting a first low power radar signal from a first transmitter fixed at a first location on the vehicle; and
   transmitting a second low power radar signal from a second transmitter fixed at a second location on the vehicle, the first location being different than the second location.

5. The method of claim 4, wherein the first location is on a first side of the vehicle and the second location is on the second side of the vehicle.

6. The method of claim 1, wherein authenticating that the transceiver is a legitimate transceiver further comprises determining that the transceiver is within a predetermined distance from the vehicle based on the low power radar signal.

7. The method of claim 6, wherein authenticating that the transceiver is a legitimate transceiver for accessing the vehicle further comprises, after determining that the transceiver is within a predetermined distance, authenticating using challenge/response messages communicated using the low power radar signal as a spread spectrum signal transmitted at a power level below the ambient noise level.

8. The method of claim 1, wherein transmitting a low power radar signal for the vehicle further comprises changing an operating mode of the power amplifier used for amplifying the collision avoidance radar signal to switch off the power amplifier.

9. The method of claim 1, wherein the low power radar signal is characterized as being a radar signal in the 76 to 77 GHz band of the 77 to 81 GHz band.

10. A method for authenticating a transceiver in a keyless entry system for a vehicle, the method comprising:

attenuating a collision avoidance radar signal generated on the vehicle to produce a low power radar signal having a power level below an ambient noise level, wherein the collision avoidance radar signal is attenuated by switching off a power amplifier used to amplify the collision avoidance radar signal for transmission;

transmitting the low power radar signal from the vehicle in response to a signal received from the transceiver; and using the low power radar signal, authenticating that the transceiver is a legitimate transceiver for accessing the vehicle.

11. The method of claim 10, wherein transmitting a low power radar signal and authenticating that the transceiver is a legitimate transceiver further comprises communicating spread spectrum challenge/response messages using the low power radar signal below the ambient noise level.

12. The method of claim 10, wherein transmitting a low power radar signal from the vehicle further comprises:

transmitting a first low power radar signal from a first transmitter fixed at a first location on the vehicle; and transmitting a second low power radar signal from a second transmitter fixed at a second location on the vehicle, the first location being different than the second location.

13. The method of claim 10, wherein authenticating that the transceiver is a legitimate transceiver further comprises determining that the transceiver is within a predetermined distance from the vehicle based on the low power radar signal.

14. The method of claim 10, wherein authenticating that the transceiver is a legitimate transceiver for accessing the vehicle further comprises authenticating using challenge/response messages communicated using a usable bandwidth of the low power radar signal as a spread spectrum signal transmitted at a power level below the ambient noise level.

15. The method of claim 10, wherein authenticating that the transceiver is a legitimate transceiver further comprises:

determining that the transceiver is within a predetermined distance from the vehicle based on the low power radar signal; and authenticating that the transceiver is a legitimate transceiver using challenge/response messages communicated using the low power radar signal as a spread spectrum signal transmitted at a power level below the ambient noise level.

16. A method for authenticating a transceiver in a keyless entry system for a vehicle, the method comprising:

attenuating a 77 GHz collision avoidance radar signal generated on the vehicle to produce a low power radar signal having a power level below an ambient noise level, wherein attenuating a collision avoidance radar signal comprises switching off a power amplifier used to amplify the collision avoidance radar signal for transmission;

transmitting the low power radar signal from the vehicle in response to a signal received from the transceiver;

using the low power radar signal, authenticating that the transceiver is a legitimate transceiver for accessing the vehicle using the low power radar signal to determine that a distance between the vehicle and the transceiver is less than predetermined distance; and authenticating that the transceiver is a legitimate transceiver using the low power radar signal to communicate with the transceiver using spread spectrum challenge/response messages.

17. The method of claim 16, wherein transmitting a low power radar signal from the vehicle further comprises:

transmitting a first low power radar signal from a first transmitter fixed at a first location on the vehicle; and transmitting a second low power radar signal from a second transmitter fixed at a second location on the vehicle, the first location being different than the second location.

18. The method of claim 17, wherein the first location is on a first side of the vehicle and the second location is on the second side of the vehicle.

19. The method of claim 16, wherein authenticating that the transceiver is a legitimate transceiver for accessing the vehicle further comprises providing the transceiver with a radar transceiver for communicating the challenge response message.

20. The method of claim 16, wherein the transceiver is determined to be less than the predetermined distance from the vehicle before using the spread spectrum challenge/response messages to authenticate that the transceiver is the legitimate transceiver.

* * * * *